United States Patent
Li et al.

(10) Patent No.: US 11,212,749 B2
(45) Date of Patent: Dec. 28, 2021

(54) INFORMATION CONFIGURATION METHOD, POWER ADJUSTMENT METHOD, BASE STATION, AND MOBILE TERMINAL

(71) Applicant: VIVO MOBILE COMMUNICATION CO., LTD., Chang'an Dongguan (CN)

(72) Inventors: Na Li, Chang'an Dongguan (CN); Xiaodong Shen, Chang'an Dongguan (CN); Xiaohang Chen, Chang'an Dongguan (CN); Dajie Jiang, Chang'an Dongguan (CN); Kai Wu, Chang'an Dongguan (CN); Xiaodong Sun, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 111 days.

(21) Appl. No.: 16/624,459

(22) PCT Filed: May 2, 2018

(86) PCT No.: PCT/CN2018/085349
§ 371 (c)(1),
(2) Date: Dec. 19, 2019

(87) PCT Pub. No.: WO2018/233381
PCT Pub. Date: Dec. 27, 2018

(65) Prior Publication Data
US 2020/0163024 A1   May 21, 2020

(30) Foreign Application Priority Data
Jun. 21, 2017   (CN) .......................... 201710475695.2

(51) Int. Cl.
*H04W 52/14*   (2009.01)
*H04L 5/00*   (2006.01)
(Continued)

(52) U.S. Cl.
CPC .......... *H04W 52/146* (2013.01); *H04L 5/001* (2013.01); *H04L 27/2605* (2013.01);
(Continued)

(58) Field of Classification Search
CPC ........................ H04W 52/146; H04W 72/0413; H04L 5/001; H04L 27/2605; H04L 27/2614; H04L 41/0806
See application file for complete search history.

(56) References Cited

U.S. PATENT DOCUMENTS

2011/0098076 A1*   4/2011   Kim .................... H04W 52/146
                                                                455/522
2011/0143800 A1    6/2011   Han et al.
(Continued)

FOREIGN PATENT DOCUMENTS

CN        101527958 A       9/2009

OTHER PUBLICATIONS

2nd Chinese Office Action for Chinese Application No. 201710475695.2, dated Apr. 28, 2020 (Apr. 28, 2020)—11 pages (English translation—12 pages).

(Continued)

*Primary Examiner* — Duc C Ho
(74) *Attorney, Agent, or Firm* — Culhane Meadows PLLC; Stephen J. Weed (57) ABSTRACT

Provided are an information configuration method, a power adjustment method, a base station, and a mobile terminal. The information configuration method comprises: configuring, according to a transmission parameter of an uplink transmission channel, a power adjustment parameter corresponding to the transmission parameter, the power adjustment parameter being used by a mobile terminal to adjust a
(Continued)

transmission power of the uplink transmission channel; and transmitting the power adjustment parameter to the mobile terminal.

16 Claims, 4 Drawing Sheets

(51) Int. Cl.
  *H04L 27/26* (2006.01)
  *H04L 12/24* (2006.01)
  *H04W 72/04* (2009.01)

(52) U.S. Cl.
  CPC ...... *H04L 27/2614* (2013.01); *H04L 41/0806* (2013.01); *H04W 72/0413* (2013.01)

(56) References Cited

U.S. PATENT DOCUMENTS

| | | | | |
|---|---|---|---|---|
| 2013/0114562 A1* | 5/2013 | Seo | ....................... | H04W 52/16 370/329 |
| 2014/0094216 A1* | 4/2014 | Park | ...................... | H04W 52/40 455/522 |
| 2015/0334662 A1 | 11/2015 | Baldemair et al. | | |
| 2016/0249299 A1* | 8/2016 | Ahn | .................. | H04W 56/0005 |
| 2018/0279229 A1* | 9/2018 | Dinan | ................. | H04W 52/367 |
| 2018/0279365 A1* | 9/2018 | Wang | ................ | H04W 74/0808 |

OTHER PUBLICATIONS

CATT: "NR Power Control Framework," R1-1710043, 3GPP TSG RAN WG1 NR Ad Hoc #2, Qingdao, P.R. China, Jun. 27, 2017, 15 pages.
Intel Corporation: "PUSCH and PUCCH Power Control," R1-1710586, 3GPP TSG RAN WG1 NR Ad Hoc Meeting, Qingdao, China, Jun. 27, 2017, 6 pages.
International Search Report and Written Opinion for International Application No. PCT/CN2018/085349, dated Jan. 2, 2020 (Jan. 2, 2020)—10 pages (English translation—9 pages).
Partial European Search Report for European Application No. 18819671.1, dated May 18, 2020 (May 18, 2020)—19 pages.
Samsung: "Power Control Framework," R1-1710765, 3GPP TSG RAN WG1 NR Ad-Hoc #2, Qingdao, P.R. China, Jun. 27, 2017, 5 pages.

* cited by examiner

INFORMATION CONFIGURATION METHOD, POWER ADJUSTMENT METHOD, BASE STATION, AND MOBILE TERMINAL

CROSS-REFERENCE TO RELATED APPLICATION

This application is the U.S. national phase of PCT Application No. PCT/CN2018/085349 filed on May 2, 2018, which claims a priority to Chinese Patent Application No. 201710475695.2 filed in China on Jun. 21, 2017, the disclosures of which are incorporated in their entirety by reference herein.

TECHNICAL FIELD

The present disclosure relates to the field of communication application technologies, in particular to an information configuration method, a power adjustment method, a base station, and a mobile terminal.

BACKGROUND

Different waveforms, numerologies, and Physical Uplink Control Channels (PUCCHs) of different symbol numbers are introduced in the New Radio (NR) system. For Cyclic Prefix Orthogonal Frequency Division Multiplexing (CP-OFDM) and Discrete Fourier Transform Spread OFDM (DFT-S-OFDM) waveforms, the Peak to Average Power Ratio (PAPR) of the DFT-S-OFDM is about 1~3 dB lower than that of the CP-OFDM. Therefore, the maximum transmission power of the PUCCH transmitted by a User Equipment (UE) by using the CP-OFDM waveform is less than the maximum transmission power of the PUCCH transmitted by using the DFT-S-OFDM waveform.

The duration of each OFDM symbol is different when different numerologies are used. For example, the duration of each OFDM symbol at a subcarrier spacing of 30 kHz is half that of a subcarrier spacing of 15 kHz. Therefore, assuming that the PUCCHs with respective different numerologies use the same symbol number and the same physical resource block (PRB) number, the quantities of Resource Elements (REs) of the PUCCHs with respective different numerologies are the same, but the duration of the PUCCH at 30 kHz is only half of that at 15 kHz. If the UE transmits the PUCCH with the same power on each symbol, according to the formula W=P*t (W represents work, P represents power, t represents time), the larger the Subcarrier Spacing (SCS), the shorter the duration of the PUCCH, the smaller the signal energy received by the receiving end, and the smaller the energy for transmitting each bit of information, the worse the demodulation performance.

The PUCCH symbol number in the NR system is variable, but the content carried on the PUCCH is the Uplink Control Information (UCI), the size of the UCI is determined by a Hybrid Automatic Repeat reQuest (HARQ)/a Scheduling Request (SR)/a Channel State Information (CSI), and cannot be scaled according to the PUCCH symbol number. The purpose of power control of LTE is to make the Signal-to-Noise Ratio (SNR) of different UEs at the receiving end the same. However, in the case of the same SNR, the UE transmits the PUCCH with the same transmission power. For PUCCHs with different symbol numbers carrying the UCIs of the same size, the fewer the number of PUCCH symbols, the smaller the energy for transmitting UCI per bit, and the higher the corresponding Bit Error Ratio (BER)/Block Error Rate (BLER). In other words, the shorter the PUCCH, the higher the SNR required by the receiving terminal, so as to obtain the same BER/BLER.

In addition, there are different service types in the NR, such as enhanced Mobile Broadband (eMBB) service, Ultra-Reliable & Low Latency communication (URLLC) service, and massive Machine Type Communication (mMTC) service, etc., different services have different performance requirements, such as network delay, bandwidth, and reliability, etc. As an important service type in the NR, the URLLC has high requirements for low latency and high reliability, while the eMBB requires higher channel bandwidth. In order to meet the requirements of different services, different system configurations are required.

In summary, for the transmission power of the uplink transmission channel in the NR system, a new power design scheme needs to be proposed, so as to satisfy the design of PUCCHs with different waveforms, numerologies and symbol numbers or the transmission power control of the Physical Uplink Shared Channels (PUSCHs) with different waveforms, numerologies and service types in the NR system.

SUMMARY

An object of the present disclosure is to provide an information configuration method, a power adjustment method, a base station and a mobile terminal, which are used to solve the problem of transmission power control of an uplink transmission channel having different transmission parameters.

In order to achieve the above object, the present disclosure provides an information configuration method applied to base station, including: configuring, according to a transmission parameter of an uplink transmission channel, a power adjustment parameter corresponding to the transmission parameter, the power adjustment parameter being used by a mobile terminal to adjust a transmission power of the uplink transmission channel; and transmitting the power adjustment parameter to the mobile terminal.

In order to achieve the above object, the present disclosure further provides a power adjustment method applied to a mobile terminal, including: obtaining a power adjustment parameter, the power adjustment parameter being determined by the mobile terminal according to an OFDM symbol number of an uplink transmission channel; and adjusting a transmission power of the uplink transmission channel according to the power adjustment parameter.

In order to achieve the above object, the present disclosure further provides a base station, including: a configuration module, configured to configure, according to a transmission parameter of an uplink transmission channel, a power adjustment parameter corresponding to the transmission parameter, the power adjustment parameter being used by a mobile terminal to adjust a transmission power of the uplink transmission channel; and a transmission module, configured to transmit the power adjustment parameter to the mobile terminal.

In order to achieve the above object, the present disclosure further provides a base station, including a first memory, a first processor, and a first computer program stored in the first memory and capable of being executed by the first processor, wherein the first processor is configured to execute the first computer program to implement steps of the above information configuration method.

In order to achieve the above object, the present disclosure further provides a computer-readable storage medium storing therein a first computer program, wherein the first computer program is capable of being executed by a processor, to implement steps of the above information configuration method.

In order to achieve the above object, the present disclosure further provides a mobile terminal, including: an obtaining module, configured to obtain a power adjustment parameter, the power adjustment parameter being determined by the mobile terminal according to an OFDM symbol number of an uplink transmission channel; and an adjustment module, configured to adjust a transmission power of the uplink transmission channel according to the power adjustment parameter.

In order to achieve the above object, an embodiment of the present disclosure further provides a mobile terminal, including a second memory, a second processor, and a second computer program stored in the second memory and capable of being executed by the second processor, wherein the second processor is configured to execute the second computer program to implement steps of the above power adjustment method.

In order to achieve the above object, an embodiment of the present disclosure further provides a computer readable storage medium storing therein a second computer program, wherein the second computer program is capable of being executed by a processor, to implement steps of the above power adjustment method.

Embodiments of the present disclosure may have the following beneficial effects.

In the embodiments of the present disclosure, according to the transmission parameter of the uplink transmission channel, it may configure the power adjustment parameter corresponding to the transmission parameter, wherein the power adjustment parameter is used by the mobile terminal to adjust the transmission power of the uplink transmission channel; the power adjustment parameter is transmitted to the mobile terminal, so that the mobile terminal adjusts the transmission power of the uplink transmission channel based on the power adjustment parameter. As a result, it is able to satisfy the design of PUCCHs with different waveforms, numerologies and symbol numbers or the transmission power control of the PUSCHs with different waveforms, numerologies and service types in the NR system.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
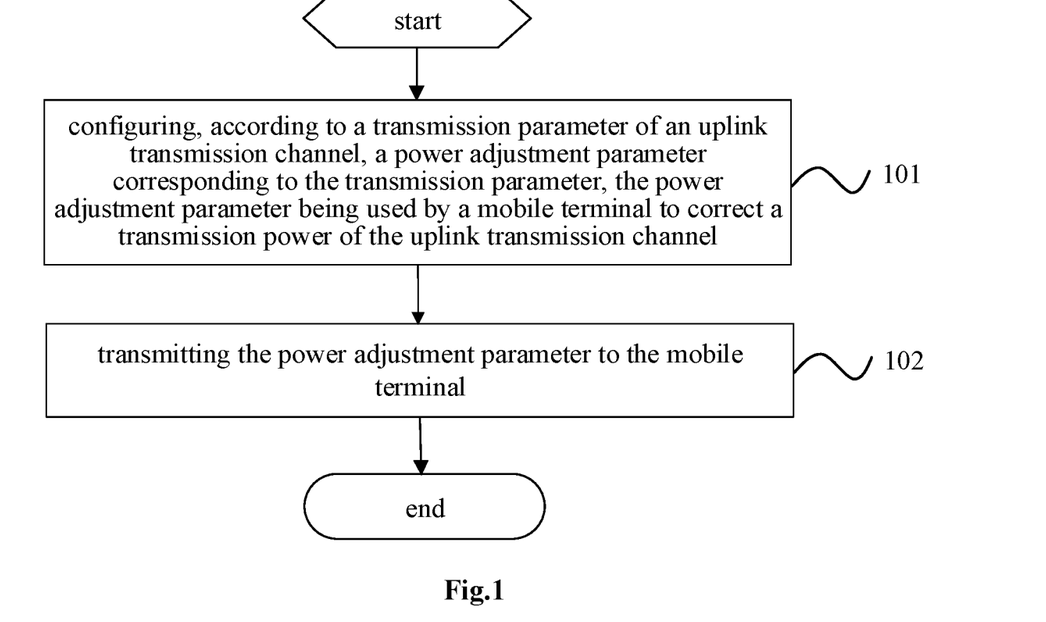
FIG. 1 is a flow chart illustrating an information configuration method according to an embodiment of the present disclosure.

As shown in FIG. 1, an embodiment of the present disclosure provides an information configuration method, which is applied to a base station, and the method includes following steps.

Step 101: configuring, according to a transmission parameter of an uplink transmission channel, a power adjustment parameter corresponding to the transmission parameter, the power adjustment parameter being used by a mobile terminal to adjust a transmission power of the uplink transmission channel.

Herein, the uplink transmission channel includes a PUCCH and/or a PUSCH. The transmission parameter includes at least one parameter. The step 101 specifically includes: configuring the power adjustment parameter corresponding to each parameter included in the transmission parameter.

Specifically, the transmission parameter of the uplink transmission channel may specifically include at least one of an OFDM symbol number of the uplink transmission channel, a numerology of the uplink transmission channel, a transmission waveform used by the uplink transmission channel and a service type of a service carried by the uplink transmission channel.

In an embodiment of the present disclosure, each parameter corresponds to a respective power adjustment parameter, or multiple parameters correspond to one power adjustment parameter. For example, when the numerology is A, a first power adjustment parameter is configured for a symbol number 1, a second power adjustment parameter is configured for a symbol number 2. At this time, the first power adjustment parameter corresponds to the symbol number 1 and the numerology A, and the second power adjustment parameter corresponds to the symbol number 2 and the numerology A; when the numerology is B, a third power adjustment parameter is configured for the symbol number 1, a fourth power adjustment parameter is configured for the symbol number 2. At this time, the third power adjustment parameter corresponds to the symbol number 1 and the numerology B, and the fourth power adjustment parameter corresponds to the symbol number 2 and the numerology B.

Step 102: transmitting the power adjustment parameter to the mobile terminal.

Herein, the power adjustment parameter is transmitted to the mobile terminal, so that the mobile terminal adjusts the transmission power of the uplink transmission channel transmitted by the mobile terminal according to the power adjustment parameter.

When the transmission parameter includes an OFDM symbol number of the uplink transmission channel, as an optional implementation, the step 101 includes: obtaining a power adjustment parameter corresponding to the OFDM symbol number of the uplink transmission channel according to a predetermined first correspondence between the OFDM symbol numbers and the corresponding power adjustment parameters, wherein in the first correspondence, when a first OFDM symbol number is greater than a second OFDM symbol number, a first power adjustment parameter corresponding to the first OFDM symbol number is less than a second power adjustment parameter corresponding to the second OFDM symbol number.

Herein, the base station configures respective power adjustment parameters for the PUCCHs having different OFDM symbol numbers, the longer the PUCCH symbol number, the smaller the power adjustment parameter.

When the transmission parameter includes a numerology of the uplink transmission channel, and the numerology comprises a subcarrier spacing and a cyclic prefix (CP) length, the step 101 includes: obtaining a third power adjustment parameter corresponding to the subcarrier spacing of the uplink transmission channel according to a predetermined second correspondence between the subcarrier spacings and the corresponding power adjustment parameters, wherein in the second correspondence, a value of the power adjustment parameter increases as the subcarrier spacing increases; obtaining a fourth power adjustment parameter corresponding to the CP length of the uplink transmission channel according to a predetermined third correspondence between the CP lengths and the corresponding power adjustment parameters, wherein in the third correspondence, a value of the power adjustment parameter decreases as the CP length increases; and obtaining a weighted sum of the third power adjustment parameter and the fourth power adjustment parameter according to a first weight of the subcarrier spacing and a second weight of the CP length, to obtain the power adjustment parameter corresponding to the numerology.

In the embodiment of the present disclosure, the PUCCH with a type of numerology is defined as a basic numerology, and a power offset thereof is zero. For example, when the PUCCH with the normal CP and the subcarrier spacing of 15 kHz is defined as the basic numerology, the power offset (15, NCP) is equal to 0.

The PUCCH with another numerology introduces a transmission power offset (scs, xCP) with respect to the PUCCH with the basic numerology, wherein the scs represents the subcarrier spacing of the PUCCH, and the x represents the CP length of the PUCCH.

The base station pre-configures the power offset (scs, xCP). When the UE transmits the PUCCH, the numerology used by the UE corresponds to the power offset (scs, xCP), and a power offset (scs, xCP) of the adjustment parameter is introduced in the formula for calculating transmission power of the terminal.

In the embodiment of the present disclosure, the power offset of the adjustment parameter is introduced in the formula for calculating transmission power of the terminal according to the numerology of the PUCCH, and different power offsets are configured for the numerologies of different PUCCHs. This scheme is applicable to both the PUCCH and the PUSCH.

When the transmission parameter includes a transmission waveform used by the uplink transmission channel, as an optional implementation, the above step 101 includes: obtaining the power adjustment parameter corresponding to the transmission waveform used by the uplink transmission channel according to a predetermined fourth correspondence between the transmission waveforms and the corresponding power adjustment parameters.

Different power adjustment parameters are configured according to different waveforms. When the CP-OFDM is used, its corresponding power adjustment parameter is P1. When the DFT-S-OFDM is used, its corresponding power adjustment parameter is P2, and P1 is less than P2, and the power adjustment parameter herein is used to adjust the maximum transmission power $P_{CMAX}$ in the formula for calculating transmission power of the terminal.

When the transmission parameter includes a transmission waveform used by the uplink transmission channel, as another optional implementation, the step 101 includes: obtaining the power adjustment parameter corresponding to the transmission waveform used by the uplink transmission channel according to a power adjustment parameter of a predetermined transmission waveform and a power offset between the transmission waveform used by the uplink transmission channel and the predetermined transmission waveform.

According to different waveforms, a power offset of the adjustment parameter is introduced in the formula for calculating the transmission power of the terminal. For example, the power offset of a certain waveform is defined as 0, and the power offset of the PUCCH of another waveform relative to the waveform is defined as power offset (w), wherein w represents the transmission waveform of the PUCCH. For example, the power offset of the uplink transmission using the DFT-S-OFDM relative to the uplink transmission using CP-OFDM is equal to −3 dB/−2 dB/−1 dB. When the terminal calculates the transmission power, the $P_{CMAX}$ in the formula of the transmission power is changed to $P_{CMAX}$+power offset (w).

Herein, different power adjustment parameters are configured according to different transmission waveforms, and the maximum transmission power of the UE is smaller when the uplink transmission using the CP-OFDM instead of the uplink transmission using the DFT-S-OFDM is adopted. This scheme is applicable to both the PUCCH and the PUSCH.

When the transmission parameter includes a service type of a service carried by the uplink transmission channel, the step 101 includes: configuring, for a bearer for transmitting the uplink transmission channel, a power adjustment parameter corresponding to the service type of the service carried by the uplink transmission channel according to a predetermined fifth correspondence between the service types and the corresponding power adjustment parameters, wherein the bearer comprises the mobile terminal, a transmission resource or a beam.

In the embodiment of the present disclosure, according to the predetermined fifth correspondence between the service types and the corresponding power adjustment parameters, the corresponding power adjustment parameter is configured for a mobile terminal, a transmission resource, or a beam carrying the same type of service. The power adjustment parameter is used to adjust $P_o$ or $\alpha$ in the power calculation formula of the PUSCH. This scheme is applicable to the PUSCH.

The existing power calculation formula of the PUSCH is:

$$P_{PUSCH,c}(i) = \min \begin{Bmatrix} P_{CMAX,c}(i), \\ 10\log_{10}(M_{PUSCH,c}(i)) + \\ P_{O\_PUSCH,c}(j) + \alpha_c(j) \cdot \\ PL_c + \Delta_{TF,c}(i) + f_c(i) \end{Bmatrix}.$$

The $P_{PUSCH,c}(i)$ represents the transmission power used by the mobile terminal to transmit the PUSCH, the $P_{CMAX,c}(i)$ represents the maximum transmission power of the mobile terminal. The $P_{O\_PUSCH}$ represents a parameter configured by a high layer, the $P_{O\_PUCCH}$ represents a sum of the $P_{O\_NOMINAL\_PUCCH}$ and the $P_{O\_UE\_PUCCH}$, the $P_{O\_NOMINAL\_PUCCH}$ represents the cell nominal power, the $P_{O\_UE\_PUCCH}$ represents a UE-specific nominal power, the $M_{PUSCH,c}(i)$ represents a quantity of resource blocks occupied by the PUSCH, the $PL_c$ represents downlink path loss estimated by the UE, the $f_c$ represents a power adjustment value formed by closed loop power control, and the $\alpha_c$ represents a compensation factor of the path loss, which is configured by the high layer. The $\alpha_c=1$ represents a total path loss compensation. When uplink channel quality of a UE deteriorates, the UE increases the transmission power. However, when maximization of the total spectrum efficiency of multiple cells is taken into consideration, if it is to simply increase the transmission power of UE at the cell edge, the overall system capacity will be decreased due to an increase in inter-cell interference. The $\alpha_c<1$ represents partial path loss compensation, that is, the increase in the power of the UE at the cell edge is limited from the perspective of maximizing the total capacity of the entire system.

In the information configuration method of the embodiment of the present disclosure, it configures the adjustment parameter corresponding to the transmission parameter according to the transmission parameter of the uplink transmission channel, wherein the power adjustment parameter is used by the mobile terminal to adjust the transmission power of the uplink transmission channel; the power adjustment parameter is transmitted to the mobile terminal, so that the mobile terminal adjusts the transmission power of the uplink transmission channel based on the power adjustment parameter. As a result, it is able to satisfy the design of PUCCHs with different waveforms, numerologies and symbol numbers or the transmission power control of the PUSCHs with different waveforms, numerologies and service types in the NR system.

Figure 2:
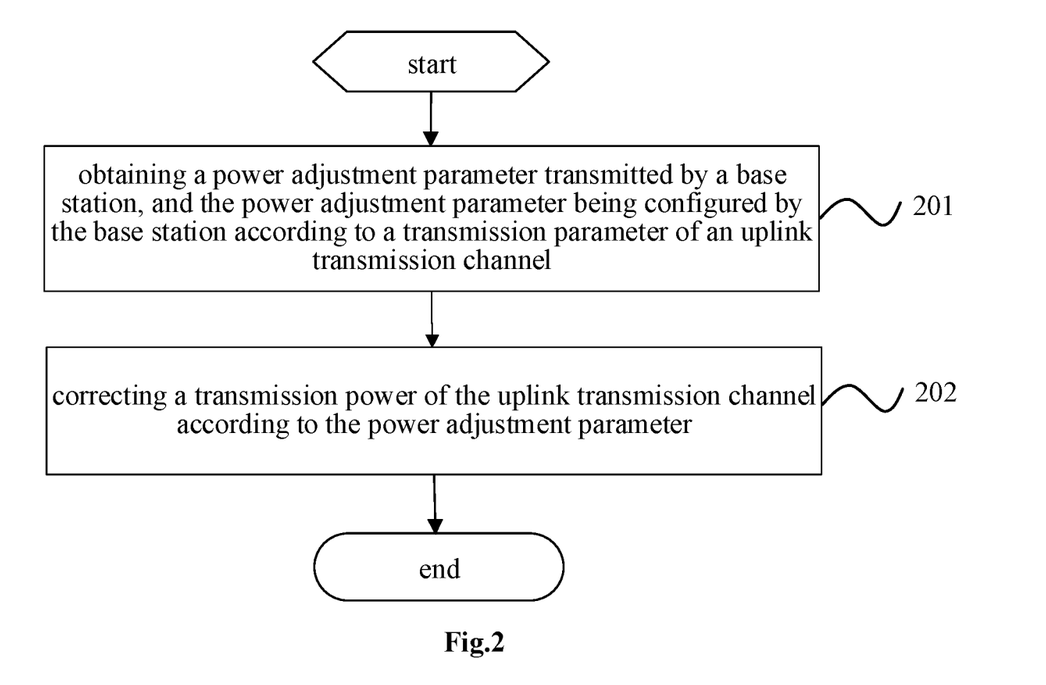
FIG. 2 is a flow chart illustrating a power adjustment method according to an embodiment of the present disclosure.

As shown in FIG. 2, the embodiment of the present disclosure further provides a power adjustment method applied to a mobile terminal, and the method includes following steps.

Step 201: obtaining a power adjustment parameter transmitted by a base station, and the power adjustment parameter being configured by the base station according to a transmission parameter of an uplink transmission channel.

The transmission parameter in the embodiment of the present disclosure includes at least one parameter, the base station configures a power adjustment parameter corresponding to each parameter included in the transmission parameter. Specifically, the transmission parameter of the uplink channel may include at least one of an OFDM symbol number of the uplink transmission channel, a numerology of the uplink transmission channel, a transmission waveform used by the uplink transmission channel and a service type of a service carried by the uplink transmission channel.

Therefore, the power adjustment parameter includes at least one of the power adjustment parameter corresponding to a OFDM symbol of the uplink transmission channel, the power adjustment parameter corresponding to a numerology of the uplink transmission channel, the power adjustment parameter corresponding to a transmission waveform used by the uplink transmission channel, and the power adjustment parameter corresponding to the service type of the service carried by the uplink transmission channel.

In this embodiment of the present disclosure, when the transmission parameter includes OFDM symbol number of the uplink transmission channel, the UE can obtain the corresponding power adjustment parameter according to the formula agreed by a protocol. For example, the power adjustment parameter corresponding to the OFDM symbol number of the uplink transmission channel is obtained according to the formula power offset=$-10 \log 10(L/L_0)$. The power offset represents the power adjustment parameter, the $L_0$ represents a predetermined reference OFDM symbol number, and the L represents the OFDM symbol number of the uplink transmission channel.

It is assumed that a type of OFDM symbol number is defined as a basic symbol number, and its power adjustment parameter, i.e., power offset, is 0. For example, if 8 OFDM symbol numbers are defined as the basic length, then power offset (8) is equal to 0. For the PUCCH with another symbol number relative to the PUCCH with the basic symbol number, the formula power offset (L) is introduced, wherein L represents the symbol number of the PUCCH. When transmitting the PUCCH, the UE enables the symbol number thereof to correspond to the power offset (L), and the power offset (L) of the adjustment parameter is introduced in a formula for calculating the transmission power of the terminal.

In addition, when the transmission parameter includes the OFDM symbol number of the uplink transmission channel, a value corresponding to a predetermined parameter in formula for calculating a predetermined transmission power may also be calculated according to the symbol number of the PUCCH, and the predetermined parameter is $\Delta_{TF,c}$.

$\Delta_{TF,c}(i) = 10 \log_{10}(2^{1.25 \cdot BPRE(i)} - 1)$, wherein $BPRE(i) = O_{UCI}(i)/N_{RE}(i)$, the $O_{UCI}(i)$ represents the quantity of bits of a Hybrid Automatic Repeat Request Acknowledgment (HARQ-ACK), or a Scheduling Request (SR), or a Rank Indicator (RI), or a Channel Quality Indicator (CQI), or a Precoding Matrix Indicator (PMI), which includes Cyclic Redundancy Check (CRC) code and is transmitted on the PUCCH.

The $N_{RE}$ represents the quantity of REs available in PUCCH, the calculation methods are different with respect to different PUCCH formats. For example, when PUCCH Demodulation Reference Signal (DMRS) occupies the entire OFDM symbol, $N_{RE}(i) = M_{PUCCH,c}(i) \cdot N_{SC}^{RB} \cdot N_{symb}^{PUCCH}/N_{UE}$, wherein the $M_{PUCCH,c}(i)$ represents the quantity of PRBs occupied by the PUCCH, the $N_{SC}^{RB}$ represents the quantity of subcarriers for each Resource Block (RB), the $N_{symb}^{PUCCH}$ represents symbol number occupied by the UCI in the PUCCH, and the $N_{UE}$ represents the quantity of users multiplexed on the same source.

For different PUCCH symbol numbers in the embodiments of the present disclosure, the values of the parameter $N_{symb}^{PUCCH}$ are different, the quantity $N_{RE}$ of the REs available in the PUCCH is the quantity of the REs occupied by the PUCCH minus the quantity of the REs occupied by the PUCCH DMRS.

Step 202: adjusting a transmission power of the uplink transmission channel according to the power adjustment parameter.

Specifically, when the power adjustment parameter includes a power adjustment parameter corresponding to a transmission waveform used by the uplink transmission channel, a maximum transmission power of the uplink transmission channel is adjusted according to the power adjustment parameter corresponding to the transmission waveform used by the uplink transmission channel.

When the power adjustment parameter includes another power adjustment parameter other than the power adjustment parameter corresponding to the transmission waveform used by the uplink transmission channel, and the currently calculated transmission power of the mobile terminal is adjusted according to the another power adjustment parameter.

Herein, when the power adjustment parameter includes another power adjustment parameter other than the power adjustment parameter corresponding to the transmission waveform used by the uplink transmission channel (for example, a power adjustment parameter corresponding to the OFDM symbol number of the transmission channel, a power adjustment parameter corresponding to the numerology of the uplink transmission channel, or a power adjustment parameter corresponding to the service type of the service carried by the uplink transmission channel), and the currently calculated transmission power of the mobile terminal is adjusted according to the another power adjustment parameter.

In the embodiment of the present disclosure, the currently calculated transmission power of the mobile terminal is calculated by using the formula for calculating the predetermined transmission power.

At present, PUCCH is designed to be in different formats, and formulas for power control calculation corresponding to different formats are different. For PUCCH format 1/1a/1b/2/2a/2b/3, the formula for calculating the transmission power thereof is as follows:

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix}.$$

The formula for calculating the transmission power corresponding to
PUCCH format 4/5 is as follows:

$$P_{PUCCH}(i) = \min\begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{Bmatrix}.$$

The $P_{CMAX,c}$ represents the maximum transmission power of the mobile terminal, the $PL_c$ represents downlink path loss estimated by the UE, the $h(n_{CQI}, n_{HARQ}, n_{SR})$ is related to the PUCCH format and the UCI carried by the PUCCH, and the $\Delta_{F\_PUCCH}$ represents a power offset of the PUCCH format (F) relative to the PUCCH format 1a. When the PUCCH is transmitted through two antenna ports, the $\Delta_{TxD}$ (F') is configured by the high layer, otherwise it is equal to zero, the g represents the power adjustment value formed by the closed loop power control.

For the PUCCH format 4, the $M_{PUCCH,c}(i)$ represents the quantity of PRBs occupied by the PUCCH; and for the PUCCH format 5, $M_{PUCCH,c}(i)=1$ The $P_{O\_PUCCH}$ represents the sum of the $P_{O\_NOMINAL\_PUCCH}$ and the $P_{O\_UE\_PUCCH}$, the $P_{O\_NOMINAL\_PUCCH}$ represents the cell nominal power, and the $P_{O\_UE\_PUCCH}$ represents the UE-specific nominal power.

$\Delta_{TF,c}(i)=10 \log_{10}(2^{1.25 \cdot BPRE(i)}-1)$, wherein $BPRE(i)=O_{UCI}(i)/N_{RE}(i)$, the $O_{UCI}(i)$ represents the quantity of bits of a HARQ-ACK/a SR/a RI/a CQI/a PMI, which includes the CRC code and is transmitted in the PUCCH format 4/5.

For the PUCCH format 4, $N_{RE}(i)=M_{PUCCH,c}(i) \cdot N_{SC}^{RB} \cdot N_{symb}^{PUCCH}$; and for the PUCCH format 5, $N_{RE}(i)=N_{SC}^{RB} \cdot N_{symb}^{PUCCH}/2$, the $N_{RE}$ represents the quantity of REs available in the PUCCH, the $N_{SC}^{RB}$ represents the quantity of subcarriers per RB, the $N_{symb}^{PUCCH}$ represents the symbol number occupied by the UCI in the PUCCH.

For the shorten PUCCH format 4/5, $N_{symb}^{PUCCH}=2 \cdot (N_{symb}^{UL}-1)-1$, otherwise, $N_{symb}^{PUCCH}=2 \cdot (N_{symb}^{UL}-1)$; and the $N_{symb}^{UL}$ represents the symbol number for the uplink transmission of each slot;

According to the power adjustment parameter obtained by the embodiment of the present disclosure, the possible formula for calculating the transmission power control of the PUCCH in the NR system is as follows.

For the PUCCH format designed based on LTE PUCCH format 1/2/3:

$$P_{PUCCH}(i) = \min\begin{Bmatrix} P_{CMAX,c}(i) + powerOffset(w), \\ P_{0\_PUCCH} + PL_c + h(n_{CQI}, n_{HARQ}, n_{SR}) + \\ \Delta_{F\_PUCCH}(F) + \Delta_{TxD}(F') + \\ powerOffset(L) + \\ powerOffset(n, xCP) + g(i) \end{Bmatrix}.$$

For the PUCCH format designed based on LTE PUCCH format 4/5:

$$P_{PUCCH}(i) = \min\begin{Bmatrix} P_{CMAX,c}(i) + powerOffset(w), \\ P_{0\_PUCCH} + PL_c + 10\log_{10}(M_{PUCCH,c}(i)) + \\ \Delta_{TF,c}(i) + \Delta_{F\_PUCCH}(F) + \\ powerOffset(n, xCP) + g(i) \end{Bmatrix}.$$

Wherein,
$\Delta_{TF,c}(i)=10 \log_{10}(2^{1.25 \cdot BPRE(i)}-1)$, wherein $BPRE(i)=O_{UCI}(i)/N_{RE}(i)$, The $O_{UCI}(i)$ represents the quantity of bits of the HARQ-ACK/the SR/the RI/the CQI/the PMI, which includes the CRC and is transmitted on the PUCCH.

Figure 3:
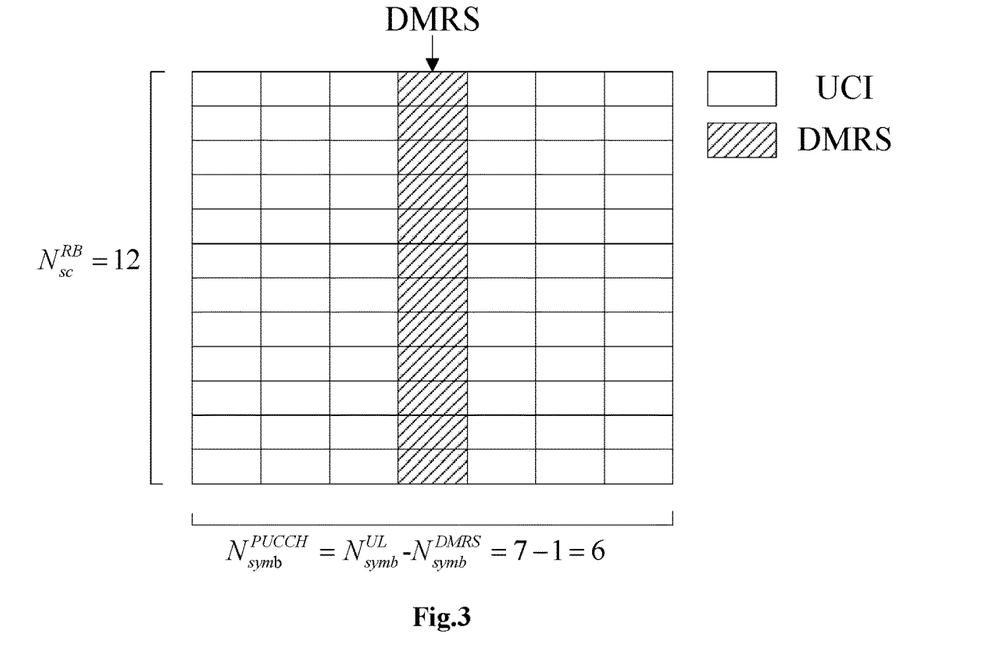
FIG. 3 is a schematic diagram illustrating display of an OFDM symbol used to transmit UCI in a PUCCH according to an embodiment of the present disclosure.

The $N_{RE}(i)$ represents the quantity of REs used for transmitting the UCI in the PUCCH, a value thereof is related to the PUCCH symbol number and the DMRS design. When the DMRS occupies an entirety of the OFDM symbol, $N_{RE}(i)=M_{PUCCH,c}(i) \cdot N_{sc}^{RB} \cdot N_{symb}^{PUCCH}/N_{UE}$, and the $N_{symb}^{PUCCH}$ represents the symbol number occupied by the UCI in the PUCCH; and for the PUCCHs with different symbol numbers, the values thereof are different, as shown in FIG. 3.

In the power adjustment process of the embodiment of the present disclosure, the power offsets of the adjustment parameters introduced for different waveforms, numerologies and symbol numbers may be respectively introduced by power offset (w), power offset (scs, xCP), and power offset (L), and may alternatively be jointly introduced, or partially and jointly introduced, such as power offset (w, scs, xCP, L), power offset (w, scs, xCP), and power offset (scs, xCP, L), etc.

In the method of adjusting power in the embodiment of the present disclosure, the mobile terminal adjusts the transmission power of the uplink transmission channel according to the power adjustment parameter configured by the base station, so as to satisfy the design of PUCCHs with different waveforms, numerologies and symbol numbers or the transmission power control of the PUSCHs with different waveforms, numerologies and service types in the NR system.

Figure 4:
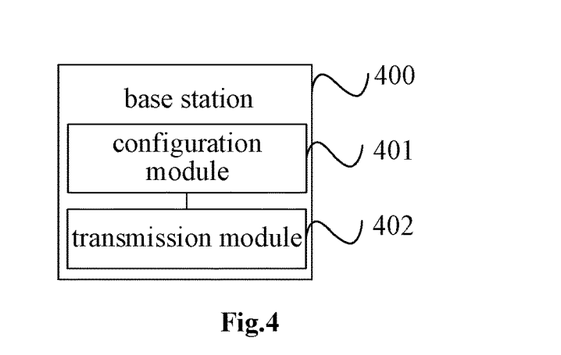
FIG. 4 is a first structural block diagram illustrating a base station according to an embodiment of the present disclosure.

As shown in FIG. 4, the embodiment of the present disclosure also provides a base station 400, including a configuration module 401 and a transmission module 402.

The configuration module 401 is configured to configure, according to a transmission parameter of an uplink transmission channel, a power adjustment parameter corresponding to the transmission parameter, the power adjustment parameter is used by a mobile terminal to adjust a transmission power of the uplink transmission channel; and the transmission module 402 is configured to transmit the power adjustment parameter to the mobile terminal.

In the base station of the embodiment of the present disclosure, the transmission parameter includes at least one of: an OFDM symbol number of the uplink transmission channel, a numerology of the uplink transmission channel, a transmission waveform used by the uplink transmission channel and a service type of a service carried by the uplink transmission channel.

For the base station of the embodiment of the present disclosure, the transmission parameter includes the OFDM symbol number of the uplink transmission channel.

The configuration module 401 is configured to obtain a power adjustment parameter corresponding to the OFDM symbol number of the uplink transmission channel according to a predetermined first correspondence between the OFDM symbol numbers and the corresponding power adjustment parameters. In the first correspondence, when a first OFDM symbol number is greater than a second OFDM symbol number, a first power adjustment parameter corresponding to the first OFDM symbol number is less than a second power adjustment parameter corresponding to the second OFDM symbol number.

For the base station of the embodiment of the present disclosure, the transmission parameter includes: a numerology of the uplink transmission channel, the numerology including a subcarrier spacing and a CP length.

The configuration module 401 includes a first configuration submodule, a second configuration submodule and a processing submodule.

The first configuration submodule is configured to obtain a third power adjustment parameter corresponding to the subcarrier spacing of the uplink transmission channel according to a predetermined second correspondence between the subcarrier spacings and the corresponding power adjustment parameters, wherein in the second correspondence, a value of the power adjustment parameter increases as the subcarrier spacing increases. The second configuration submodule is configured to obtain a fourth power adjustment parameter corresponding to the CP length of the uplink transmission channel according to a predetermined third correspondence between the CP lengths and the corresponding power adjustment parameters, wherein in the third correspondence, a value of the power adjustment parameter decreases as the CP length increases. The processing submodule is configured to obtain a weighted sum of the third power adjustment parameter and the fourth power adjustment parameter according to a first weight of the subcarrier spacing and a second weight of the CP length, to obtain the power adjustment parameter corresponding to the numerology.

For the base station of the embodiment of the present disclosure, the transmission parameter includes a transmission waveform used by the uplink transmission channel. The configuration module 401 is configured to obtain a power adjustment parameter corresponding to the transmission waveform used by the uplink transmission channel according to a predetermined fourth correspondence between the transmission waveforms and the corresponding power adjustment parameters.

For the base station of the embodiment of the present disclosure, the transmission parameter includes a transmission waveform used by the uplink transmission channel. The configuration module 401 is configured to obtain the power adjustment parameter corresponding to the transmission waveform used by the uplink transmission channel according to a power adjustment parameter of a predetermined transmission waveform and a power offset between the transmission waveform used by the uplink transmission channel and the predetermined transmission waveform.

For the base station of the embodiment of the present disclosure, the transmission parameter includes a service type of a service carried by the uplink transmission channel. The configuration module 401 is configured to configure a power adjustment parameter corresponding to the service type of the service carried by the uplink transmission channel for a bearer for transmitting the uplink transmission channel according to a predetermined fifth correspondence between the service types and the corresponding power adjustment parameters, the bearer includes the mobile terminal, a transmission resource or a beam.

The base station of the embodiment of the present disclosure configures the power adjustment parameter corresponding to the transmission parameter according to the transmission parameter of the uplink transmission channel, wherein the power adjustment parameter is used by the mobile terminal to adjust the transmission power of the uplink transmission channel; the power adjustment parameter is transmitted to the mobile terminal, so that the terminal adjusts the transmission power of the uplink transmission channel based on the power adjustment parameter. As a result, it is able to satisfy the design of PUCCHs with different waveforms, numerologies and symbol numbers or the transmission power control of the PUSCHs with different waveforms, numerologies and service types in the NR system.

Figure 5:
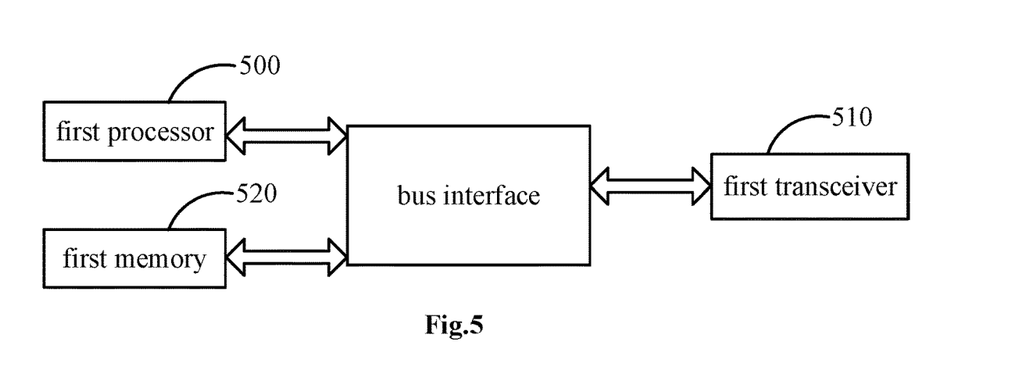
FIG. 5 is a second structural block diagram illustrating a base station according to an embodiment of the present disclosure.

In order to achieve the above object in a more preferred manner, as shown in FIG. 5, an embodiment of the present disclosure further provides a base station, including a first memory 520, a first processor 500, a first transceiver 510, a bus interface, and a first computer program stored on the first memory 520 and capable of being executed by the first processor 500, the first processor 500 is configured to read the program in the first memory 520 to: configure, according to a transmission parameter of an uplink transmission channel, a power adjustment parameter corresponding to the transmission parameter, the power adjustment parameter being used by a mobile terminal to adjust a transmission power of the uplink transmission channel; and transmit the power adjustment parameter to the mobile terminal.

In FIG. 5, the bus architecture may include any quantity of buses and bridges connected to each other, so as to connect various circuits for one or more processors such as the first processor 500 and one or more memories such as the first memory 520. In addition, the bus architecture may be used to connect various other circuits, such as a circuit for a peripheral device, a circuit for a voltage stabilizer and a power management circuit, which are known in the art and will not be further described herein. The bus interface may be provided, and the first transceiver 510 may include a plurality of elements, i.e., a transmitter and a receiver for communication with various other devices over a transmission medium. The first processor 500 may take charge of managing the bus architecture as well general processings. The first memory 520 may store data therein for the operation of the processor 500.

Optionally, the transmission parameter includes at least one of: an OFDM symbol number of the uplink transmission channel, a numerology of the uplink transmission channel, a transmission waveform used by the uplink transmission channel and a service type of a service carried by the uplink transmission channel.

Optionally, the transmission parameter includes: OFDM symbol number of the uplink transmission channel. The first processor 500 is further configured to, obtain a power adjustment parameter corresponding to the OFDM symbol number of the uplink transmission channel according to a predetermined first correspondence between the OFDM symbol numbers and the corresponding power adjustment parameters. In the first correspondence, when a first OFDM symbol number is greater than a second OFDM symbol number, a first power adjustment parameter corresponding to the first OFDM symbol number is less than a second power adjustment parameter corresponding to the second OFDM symbol number.

Optionally, the transmission parameter includes a numerology of the uplink transmission channel, the numerology including a subcarrier spacing and a CP length. The first processor 500 is further configured to: obtain a third power adjustment parameter corresponding to the subcarrier spacing of the uplink transmission channel according to a predetermined second correspondence between the subcarrier spacings and the corresponding power adjustment parameters, wherein in the second correspondence, a value of the power adjustment parameter increases as the subcarrier spacing increases; obtain a fourth power adjustment parameter corresponding to the CP length of the uplink transmission channel according to a predetermined third correspondence between the CP lengths and the corresponding power adjustment parameters, wherein in the third correspondence, a value of the power adjustment parameter decreases as the CP length increases; and obtain a weighted sum of the third power adjustment parameter and the fourth power adjustment parameter according to a first weight of the subcarrier spacing and a second weight of the CP length, to obtain the power adjustment parameter corresponding to the numerology.

Optionally, the transmission parameter includes a transmission waveform used by the uplink transmission channel. The first processor 500 is further configured to obtain the power adjustment parameter corresponding to the transmission waveform used by the uplink transmission channel according to a predetermined fourth correspondence between the transmission waveforms and the corresponding power adjustment parameters.

Optionally, the transmission parameter includes a transmission waveform used by the uplink transmission channel; and the first processor 500 is further configured to obtain a power adjustment parameter corresponding to the transmission waveform used by the uplink transmission channel according to a power adjustment parameter of a predetermined transmission waveform and a power offset between the transmission waveform used by the uplink transmission channel and the predetermined transmission waveform.

Optionally, the transmission parameter includes: a service type of a service carried by the uplink transmission channel; and the first processor 500 is further configured to configure, for a bearer for transmitting the uplink transmission channel, a power adjustment parameter corresponding to the service type of the service carried by the uplink transmission channel according to a predetermined fifth correspondence between the service types and the corresponding power adjustment parameters, wherein the bearer comprises the mobile terminal, a transmission resource or a beam.

For the base station of the embodiment of the present disclosure, it may configure the power adjustment parameter corresponding to the transmission parameter according to the transmission parameter of the uplink transmission channel, wherein the power adjustment parameter is used by the mobile terminal to adjust the transmission power of the uplink transmission channel; the power adjustment parameter is transmitted to the mobile terminal, so that the mobile terminal adjusts the transmission power of the uplink transmission channel based on the power adjustment parameter. As a result, it is able to satisfy the design of PUCCHs with different waveforms, numerologies and symbol numbers or the transmission power control of the PUSCHs with different waveforms, numerologies and service types in the NR system.

In some embodiments of the present disclosure, there is also provided a computer-readable storage medium storing therein a first computer program, wherein the first computer program is capable of being executed by a processor to: configure, according to a transmission parameter of an uplink transmission channel, a power adjustment parameter corresponding to the transmission parameter, the power adjustment parameter being used by a mobile terminal to adjust a transmission power of the uplink transmission channel; and transmit the power adjustment parameter to the mobile terminal.

In addition, the first computer program is capable of being executed by the processor to implement all implementations in the foregoing method embodiments, details thereof are not given herein again.

Figure 6:
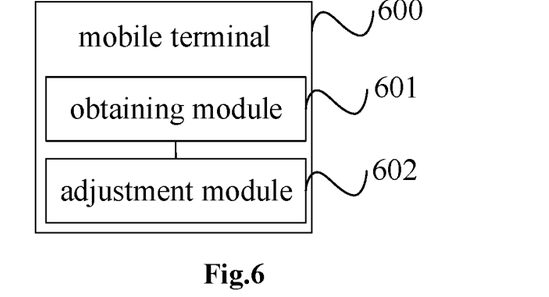
FIG. 6 is a first structural block diagram illustrating a mobile terminal according to an embodiment of the present disclosure.

As shown in FIG. 6, the embodiment of the present disclosure also provides a mobile terminal 600, including an obtaining module 601 and an adjustment module 602. The obtaining module 601 is configured to obtain a power adjustment parameter transmitted by a base station, and the power adjustment parameter is configured by the base station according to a transmission parameter of the uplink transmission channel. The adjustment module 602 is configured to adjust a transmission power of the uplink transmission channel according to the power adjustment parameter.

For the mobile terminal of the embodiment of the present disclosure, the transmission parameter includes at least one of an OFDM symbol number of the uplink transmission channel, a numerology of the uplink transmission channel, a transmission waveform used by the uplink transmission channel and a service type of a service carried by the uplink transmission channel.

For the mobile terminal of the embodiment of the present disclosure, the adjustment module 602 is configured to, in the case that the power adjustment parameter includes a power adjustment parameter corresponding to a transmission waveform used by the uplink transmission channel, adjust a maximum transmission power of the uplink transmission channel according to the power adjustment parameter corresponding to the transmission waveform used by the uplink transmission channel.

For the mobile terminal of the embodiment of the present disclosure, the adjustment module 602 is configured to, in the case that the power adjustment parameter includes another power adjustment parameter other than the power adjustment parameter corresponding to the transmission waveform used by the uplink transmission channel, adjust the currently calculated transmission power of the mobile terminal according to the another power adjustment parameters.

For the mobile terminal of the embodiment of the present disclosure, the mobile terminal adjusts the transmission power of the uplink transmission channel according to the power adjustment parameter configured by the base station. As a result, it is able to satisfy the design of PUCCHs with different waveforms, numerologies and symbol numbers or the transmission power control of the PUSCHs with different service types in the NR system.

It should be noted that the mobile terminal is a terminal corresponding to the foregoing method embodiments. All the implementations in the foregoing method embodiments are applicable to the embodiments of the mobile terminal, and the same technical effects can be achieved.

Figure 7:
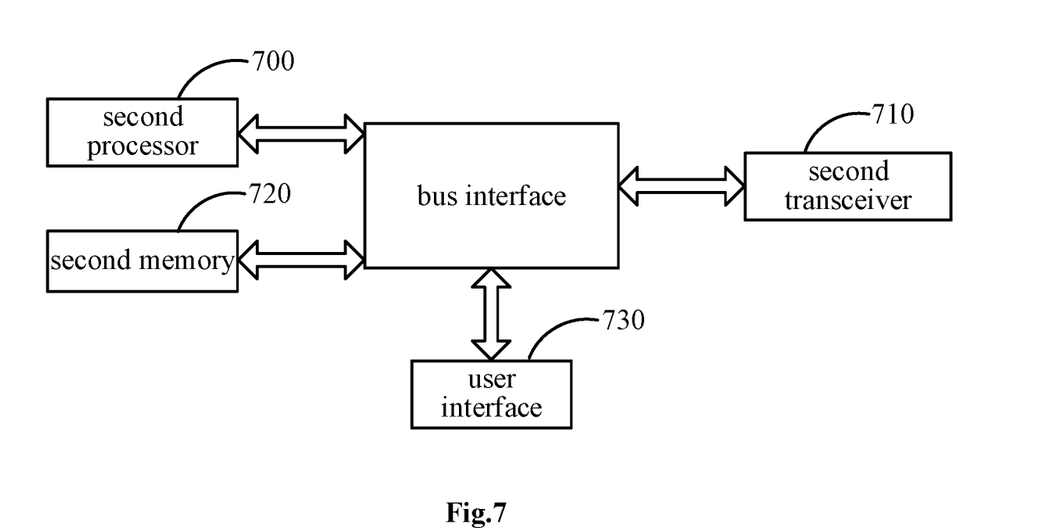
FIG. 7 is a second structural block diagram illustrating a mobile terminal according to an embodiment of the present disclosure.

In order to achieve the above object in a more preferred manner, as shown in FIG. 7, an embodiment of the present disclosure further provides a mobile terminal, including a second memory 720, a second processor 700, a second transceiver 710, a user interface 730, a bus interface, and a second computer program stored on the second memory 720 and capable of being executed by the second processor 700, the second processor 700 is configured to read the program in the second memory 720 to: obtain a power adjustment parameter transmitted by a base station, the power adjustment parameter being configured by the base station according to a transmission parameter of an uplink transmission channel; and adjusting a transmission power of the uplink transmission channel according to the power adjustment parameter.

In FIG. 7, the bus architecture may include any quantity of buses and bridges connected to each other, so as to connect various circuits for one or more processors such as the second processor 700 and one or more memories such as the second memory 720. In addition, the bus architecture may be used to connect various other circuits, such as a circuit for a peripheral device, a circuit for a voltage stabilizer and a power management circuit, which are known in the art and will not be further described herein. The bus interface may be provided, and the second transceiver 710 may include a plurality of elements, i.e., a transmitter and a receiver for communication with various other devices over a transmission medium. For different UEs, the user interface 730 may also be an interface capable of internally or externally connecting a required device, including but not limited to a keypad, a display, a speaker, a microphone, a joystick, and the like. The second processor 700 may take charge of managing the bus architecture as well general processings. The second memory 720 may store data therein for the operation of the second processor 700.

Optionally, the transmission parameter includes at least one of an OFDM symbol number of the uplink transmission channel, a numerology of the uplink transmission channel, a transmission waveform used by the uplink transmission channel and a service type of a service carried by the uplink transmission channel.

The second processor 700 is further configured to, when the power adjustment parameter includes a power adjustment parameter corresponding to a transmission waveform used by the uplink transmission channel, adjust a maximum transmission power of the uplink transmission channel according to the power adjustment parameter corresponding to the transmission waveform used by the uplink transmission channel.

The second processor 700 is further configured to, when the power adjustment parameter includes another power adjustment parameter other than the power adjustment parameter corresponding to the transmission waveform used by the uplink transmission channel, adjust the currently calculated transmission power of the mobile terminal according to the another power adjustment parameters.

In some embodiments of the present disclosure, there is also provided a computer-readable storage medium storing therein a second computer program, wherein the second computer program is capable of being executed by a processor to: obtain a power adjustment parameter transmitted from a base station, the power adjustment parameter being configured by the base station according to a transmission parameter of an uplink transmission channel; and adjust a transmission power of the uplink transmission channel according to the power adjustment parameter.

It should be noted that, the second computer program is capable of being executed by the processor to implement all implementations in the foregoing method embodiments, details thereof are not given herein again.

Figure 8:
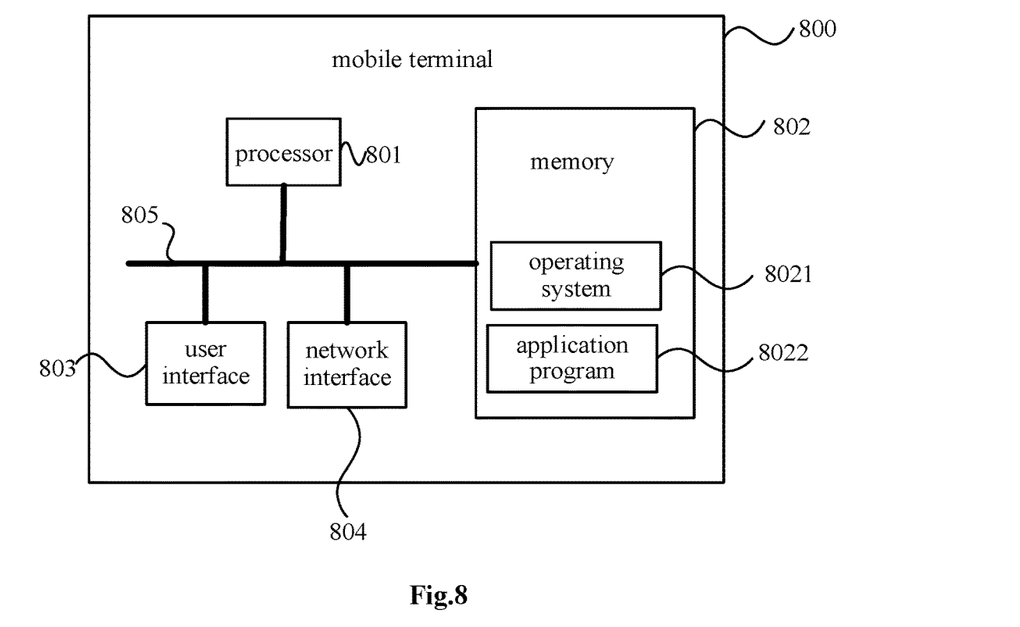
FIG. 8 is a third structural block diagram illustrating a mobile terminal according to an embodiment of the present disclosure.

As shown in FIG. 8, FIG. 8 is still another structural block diagram of a mobile terminal according to an embodiment of the present disclosure. The mobile terminal 800 shown in FIG. 8 includes: at least one processor 801, a memory 802, at least one network interface 804, and another user interface 803. The various components in mobile terminal 800 are coupled together by a bus system 805. It should be appreciated that the bus system 805 is used to implement link communication between these components. The bus system 805 includes a power bus, a control bus, and a status signal bus in addition to the data bus. However, for clarity of description, various buses are labeled as the bus system 805 in FIG. 8.

The user interface 803 may include a display, a keyboard or a pointing device (e.g., a mouse, a trackball, a touch pad or a touch screen, etc.).

It is to be understood that the memory 802 in the embodiment of the present disclosure can be either a volatile memory or a non-volatile memory, or can include both the volatile memory and the non-volatile memory. The non-volatile memory may be a Read-Only Memory (ROM), a Programmable ROM (PROM), an Erasable PROM (EPROM), or an Electrically EPROM (EEPROM) or a flash memory. The volatile memory can be a Random Access Memory (RAM) that serves as an external cache. Exemplarily but not restrictively, many forms of a RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The memory 802 of the systems and methods described herein is intended to include, but is not limited to, these and any other suitable type of memory.

In some embodiments, the memory 802 stores the following elements: an executable module or a data structure, or a subset thereof, or an extension set thereof; an operating system 8021; and an application program 8022.

The operating system 8021 includes various system programs, such as a framework layer, a core library layer, and a driver layer, so as to implement various basic services and process a hardware-based tasks. The application 8022 includes various application programs, such as a media player, and a browser, so as to implement various application services. A program implementing the methods of the embodiment of the present disclosure can be included in the application program 8022.

In an embodiment of the present disclosure, the processor 801 is configured to call a program or an instruction stored in the memory 802, e.g., the program or instruction stored in the application program 8022 to: obtain a power adjustment parameter transmitted by a base station, and the power adjustment parameter being configured by the base station according to a transmission parameter of the uplink transmission channel; and adjust a transmission power of the uplink transmission channel according to the power adjustment parameter.

Optionally, the transmission parameter includes at least one of: an OFDM symbol number of the uplink transmission channel, a numerology of the uplink transmission channel, a transmission waveform used by the uplink transmission channel, and a service type of a service carried by the uplink transmission channel.

The processor 801 is further configured to, when the power adjustment parameter includes a power adjustment parameter corresponding to a transmission waveform used by the uplink transmission channel, adjust a maximum transmission power of the uplink transmission channel according to the power adjustment parameter corresponding to the transmission waveform used by the uplink transmission channel.

The processor 801 is further configured to, when the power adjustment parameter includes another power adjustment parameter other than the power adjustment parameter corresponding to the transmission waveform used by the uplink transmission channel, adjust the currently calculated transmission power of the mobile terminal according to the another power adjustment parameters.

In the mobile terminal 800 of the embodiment of the present disclosure, the processor 801 is configured to, according to the power adjustment parameter configured by the base station, adjust, by the mobile terminal, the transmission power of the uplink transmission channel, so as to satisfy the design of PUCCHs with different waveforms, numerologies and symbol numbers or the transmission power control of the PUSCHs with different waveforms, numerologies and service types in the NR system.

The mobile terminal in the present disclosure may be a mobile phone, a tablet computer, a Personal Digital Assistant (PDA), an on-board computer, etc.

The mobile terminal 800 may implement various processes implemented by the terminal in the foregoing embodiments. To avoid repetition, details thereof are not given herein again.

The above methods disclosed in the embodiments of the present disclosure may be applied to the processor 801 or implemented by the processor 801. The processor 801 may be an integrated circuit chip having a signal processing capability. In the implementation process, each step of the foregoing method may be completed by an integrated logic circuit being a hardware in the processor 801 or an instruction in a form of software. The processor 801 can be a general-purpose processor, a Digital Signal Processor (DSP), an Application Specific Integrated Circuit (ASIC), a Field Programmable Gate Array (FPGA), another programmable logic device, a discrete gate, a transistor logic device, or an independent hardware component, so as to implement or executes methods, steps, and logical block diagrams disclosed in the embodiments of the present disclosure. The general purpose processor may be a microprocessor, any conventional processor or the like. The steps of the method disclosed in the embodiment of the present disclosure may be implemented directly by the hardware decoding processor, or by a combination of a hardware and a software module in the hardware decoding processor. The software module can be located in a storage medium known in the art, such as a RAM, a flash memory, a ROM, a PROM, an electrically erasable programmable memory, and a register. The storage medium is located in the memory 802, and the processor 801 reads the information in the memory 802 and implements the steps of the above methods in combination with its hardware.

It should be appreciated that, the embodiments of the present disclosure may be implemented by hardware, software, firmware, middleware, microcode or a combination thereof. For the hardware implementation, the processing unit may be implemented in one or more of an ASIC, a DSP, a DSP device (DSPD), a Programmable Logic Device (PLD), an FPGA, a general-purpose processor, a controller, a microcontroller, a microprocessor, another electronic unit capable of achieving the functions in the present disclosure, or a combination thereof.

For software implementation, the techniques described herein can be implemented by modules (e.g., procedures, functions, etc.) that perform the functions described herein. The software code can be stored in the memory and executed by the processor. The memory may be implemented inside or outside the processor.

Figure 9:
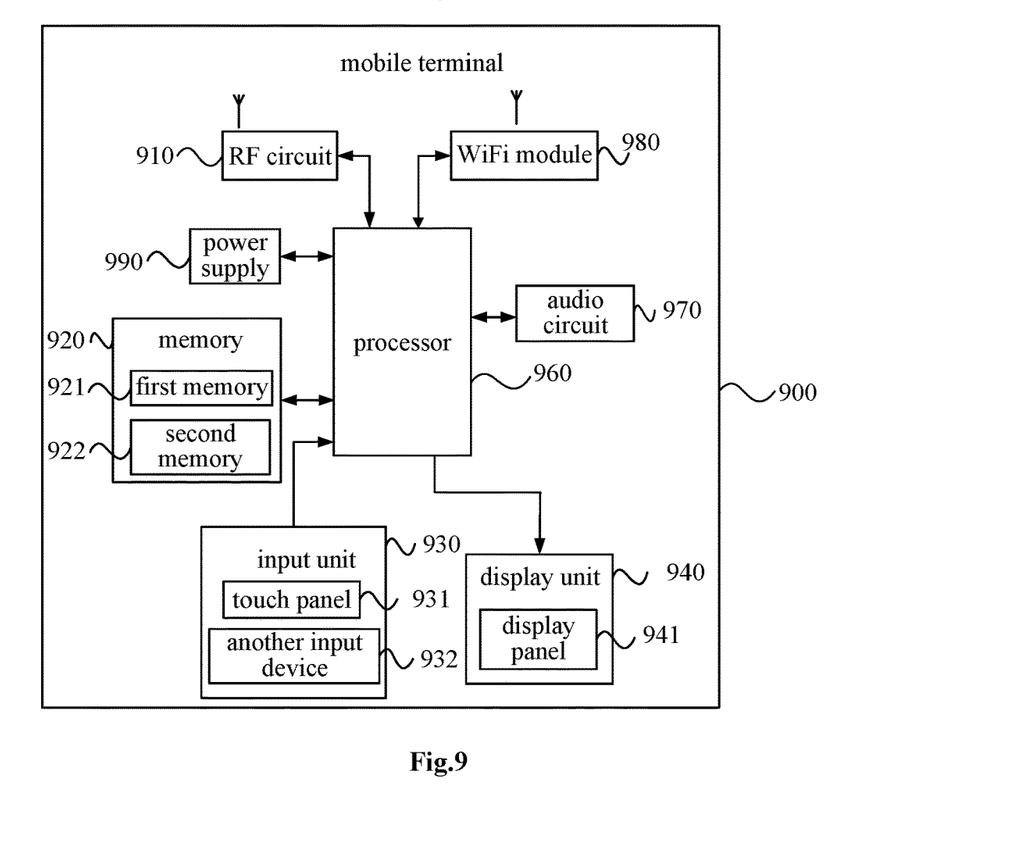
FIG. 9 is a fourth structural block diagram illustrating a mobile terminal according to an embodiment of the present disclosure.

As shown in FIG. 9, FIG. 9 is yet another block diagram illustrating a structure of a mobile terminal according to an embodiment of the present disclosure. The mobile terminal 900 shown in FIG. 9 includes a Radio Frequency (RF) circuit 910, a memory 920, an input unit 930, a display unit 940, a processor 960, an audio circuit 970, a Wireless Fidelity (WiFi) module 9100, and a power supply 990.

The input unit 930 is configured to receive digital or character information inputted by a user, and generate a signal input related to user settings and function control of the mobile terminal 900. To be specific, the input unit 930 may include a touch panel 931. The touch panel 9301, also called as touch screen, is configured to collect a touch operation made by the user on or in proximity to the touch panel (e.g., an operation made by the user through any appropriate object or attachment (e.g., finger or stylus) on the touch panel 931), and drive a corresponding connection device based on a predetermined program. Optionally, the touch panel 931 may include a touch detection device and a touch controller. The touch detection device is configured to detect a touch position of the user and a signal generated due to the touch operation, and transmit the signal to the touch controller. The touch controller is configured to receive touch information from the touch detection device, convert it into coordinates of a touch point, transmit the coordinates to the processor 960, and receive and execute a command from the processor 960. In addition, the touch panel 9301 may be of a resistive type, a capacitive type, an infrared type, a surface acoustic wave type, or the like. Apart from the touch panel 931, the input unit 930 may further include another input device 9302 which may include, but not limited to, one or more of a physical keyboard, a functional button (e.g., a volume control button or an on/off button), a trackball, a mouse, and a joystick.

The display unit 940 is configured to display information inputted by the user or information to be presented to the user, and various interfaces for the mobile terminal 900, and it may include a display panel 941. Optionally, the display panel 941 may be a Liquid Crystal Display (LCD) panel or an Organic Light-Emitting Diode (OLED) panel.

It should be appreciated that, the touch panel 931 may cover the display panel 941, so as to form a touch display panel. When the touch operation made on or in proximity to the touch display panel has been detected by the touch display panel, the touch information may be transmitted to the processor 960 to determine a type of a touch event. Then, the processor 960 may provide corresponding visual output on the touch display panel based on the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for application programs, and each interface may include an icon for at least one application program and/or an interface element such as Widget desktop control. The application interface display region may also be a blank interface where no content is contained. The commonly-used controls display region may be adopted to display controls which are used frequently, e.g., setting button, interface number, scroll bar, or such application program icons as telephone book icon.

The processor 960 may be a control center of the mobile terminal 900, and connected to each member of the entire cell phone via various interfaces and lines. The processor 960 is configured to run or execute software programs and/or modules stored in a first memory 921, and call data stored in a second memory 922, so as to achieve various functions of the mobile terminal 900 and process the data, thereby to monitor the mobile terminal 900. Optionally, the processor 960 may include one or more processing units.

In an embodiment of the present disclosure, the processor 960 may call a software program and/or module stored in the first memory 921 and/or data in the second memory 922 to: obtain a power adjustment parameter transmitted by a base station, and the power adjustment parameter being configured by the base station according to a transmission parameter of the uplink transmission channel; and adjust a transmission power of the uplink transmission channel according to the power adjustment parameter.

Optionally, the transmission parameter includes at least one of an OFDM symbol number of the uplink transmission channel, a numerology of the uplink transmission channel, a transmission waveform used by the uplink transmission channel, and a service type of a service carried by the uplink transmission channel.

The processor 960 is further configured to, when the power adjustment parameter includes a power adjustment parameter corresponding to a transmission waveform used by the uplink transmission channel, adjust a maximum transmission power of the uplink transmission channel according to the power adjustment parameter corresponding to the transmission waveform used by the uplink transmission channel.

The processor 960 is further configured to, when the power adjustment parameter includes another power adjustment parameter other than the power adjustment parameter corresponding to the transmission waveform used by the uplink transmission channel, adjust the currently calculated transmission power of the mobile terminal according to the another power adjustment parameter.

The mobile terminal in the present disclosure may be a mobile phone, a tablet computer, a PDA, or an on-board computer, etc.

The mobile terminal 900 may implement various processes implemented by the terminal in the foregoing embodiments. To avoid repetition, details thereof are not given herein again.

In the mobile terminal 900 of the embodiment of the present disclosure, the processor 960 is configured to, according to the power adjustment parameter configured by the base station, adjust, by the mobile terminal, the transmission power of the uplink transmission channel, so as to satisfy the design of PUCCHs with different waveforms, numerologies and symbol numbers or the transmission power control of the PUSCHs with different waveforms, numerologies and service types in the NR system.

A person skilled in the art may understand that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

A person skilled in the art may further understand that, for convenience and clarification, operation procedures of the system, device and units described hereinabove may refer to the corresponding procedures in the method embodiments, and details thereof are not given herein again.

It should be further appreciated that, in the embodiments provided by the present application, the device and method may be implemented in any other ways. For example, the embodiments for the apparatus are merely for illustrative purposes, and the units are provided merely on the basis of their logic functions, and the present disclosure is not limited thereto. During the actual application, for example, some modules or units may be combined together or integrated into another system. Alternatively, some features may be omitted or not executed. In addition, the coupling connection, direct coupling connection or communication connection between the modules or units may be implemented via interfaces, and the indirect coupling connection or communication connection between the modules or units may be implemented in an electrical or mechanical form or in another form.

The units described separately may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or substantially, or parts of the technical solutions of the present disclosure contributing to the prior art, may appear in the form of software products, which may be stored in a storage medium and include several instructions so as to enable a computer equipment (e.g., a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a ROM, a RAM, a magnetic disk or an optical disk.

A person skilled in the art may further understand that, all or part of the process of implementing the above method embodiments can be implemented by controlling a related hardware through a computer program, and the program may be stored in a computer readable storage medium. When the program is executed, the processes of the above method embodiments may be included. The storage medium may be a magnetic disk, an optical disk, a ROM, or a RAM, etc.

The above are merely preferred embodiments of the present disclosure, but the present disclosure is not limited thereto. Any modifications, equivalent substitution, improvements, etc., made within the spirit and principles of the present disclosure fall within the scope of protection of the present disclosure.

What is claimed is:

1. An information configuration method for a base station, wherein the information configuration method comprises:
    configuring, according to a transmission parameter of an uplink transmission channel, a power adjustment parameter corresponding to the transmission parameter, the power adjustment parameter being used by a mobile terminal to adjust a transmission power of the uplink transmission channel; and
    transmitting the power adjustment parameter to the mobile terminal,
    wherein the transmission parameter comprises a service type of a service carried by the uplink transmission channel;
    the configuring, according to the transmission parameter of the uplink transmission channel, the power adjustment parameter corresponding to the transmission parameter comprises:
    configuring, for a bearer for transmitting the uplink transmission channel, a power adjustment parameter corresponding to the service type of the service carried by the uplink transmission channel according to a predetermined fifth correspondence between the service types and the corresponding power adjustment parameters, wherein the bearer comprises the mobile terminal, a transmission resource or a beam.

2. The information configuration method according to claim 1, wherein the transmission parameter comprises at least one of:
    an Orthogonal Frequency Division Multiplexing (OFDM) symbol number of the uplink transmission channel, a numerology of the uplink transmission channel, and a transmission waveform used by the uplink transmission channel.

3. The information configuration method according to claim 1, wherein the transmission parameter comprises an OFDM symbol number of the uplink transmission channel;
    the configuring, according to the transmission parameter of the uplink transmission channel, the power adjustment parameter corresponding to the transmission parameter comprises:
    obtaining a power adjustment parameter corresponding to the OFDM symbol number of the uplink transmission channel according to a predetermined first correspondence between the OFDM symbol numbers and the corresponding power adjustment parameters, wherein in the first correspondence, when a first OFDM symbol number is greater than a second OFDM symbol number, a first power adjustment parameter corresponding to the first OFDM symbol number is less than a second power adjustment parameter corresponding to the second OFDM symbol number.

4. The information configuration method according to claim 1, wherein the transmission parameter comprises a numerology of the uplink transmission channel, and the numerology comprises a subcarrier spacing and a Cyclic Prefix (CP) length;
    the configuring, according to the transmission parameter of the uplink transmission channel, the power adjustment parameter corresponding to the transmission parameter comprises:
    obtaining a third power adjustment parameter corresponding to the subcarrier spacing of the uplink transmission channel according to a predetermined second correspondence between the subcarrier spacings and the corresponding power adjustment parameters, wherein in the second correspondence, a value of the power adjustment parameter increases as the subcarrier spacing increases;
    obtaining a fourth power adjustment parameter corresponding to the CP length of the uplink transmission channel according to a predetermined third correspondence between the CP lengths and the corresponding power adjustment parameters, wherein in the third correspondence, a value of the power adjustment parameter decreases as the CP length increases; and
    obtaining a weighted sum of the third power adjustment parameter and the fourth power adjustment parameter according to a first weight of the subcarrier spacing and a second weight of the CP length, to obtain the power adjustment parameter corresponding to the numerology.

5. The information configuration method according to claim 1, wherein the transmission parameter comprises a transmission waveform used by the uplink transmission channel;
    the configuring, according to the transmission parameter of the uplink transmission channel, the power adjustment parameter corresponding to the transmission parameter comprises:
    obtaining the power adjustment parameter corresponding to the transmission waveform used by the uplink transmission channel according to a predetermined fourth correspondence between the transmission waveforms and the corresponding power adjustment parameters.

6. The information configuration method according to claim 1, wherein the transmission parameter comprises a transmission waveform used by the uplink transmission channel;
    the configuring, according to the transmission parameter of the uplink transmission channel, the power adjustment parameter corresponding to the transmission parameter comprises:
    obtaining the power adjustment parameter corresponding to the transmission waveform used by the uplink transmission channel according to a power adjustment parameter of a predetermined transmission waveform and a power offset between the transmission waveform used by the uplink transmission channel and the predetermined transmission waveform.

7. A power adjustment method for a mobile terminal, wherein the power adjustment method comprises:
obtaining a power adjustment parameter, the power adjustment parameter being determined by the mobile terminal according to an OFDM symbol number of an uplink transmission channel; and
adjusting a transmission power of the uplink transmission channel according to the power adjustment parameter,
wherein the power adjustment parameter is determined by the terminal according to the OFDM symbol number of the uplink transmission channel through a following formula:

power offset=−10 log 10$(L/L_0)_L$ wherein the power offset represents the power adjustment parameter, the $L_0$ represents a predetermined reference OFDM symbol number, and the L represents the OFDM symbol number of the uplink transmission channel.

8. The power adjustment method according to claim 7, wherein the uplink transmission channel comprises a Physical Uplink Control Channel (PUCCH).

9. A base station, comprising a first memory, a first processor, and a first computer program stored in the first memory and capable of being executed by the first processor, wherein the first processor is configured to execute the first computer program to implement steps of the information configuration method according to claim 1.

10. The base station according to claim 9, wherein the transmission parameter comprises at least one of:
an OFDM symbol number of the uplink transmission channel, a numerology of the uplink transmission channel, and a transmission waveform used by the uplink transmission channel.

11. The base station according to claim 9, wherein the transmission parameter comprises an OFDM symbol number of the uplink transmission channel;
the first processor is further configured to execute the first computer program to:
obtain a power adjustment parameter corresponding to the OFDM symbol number of the uplink transmission channel according to a predetermined first correspondence between the OFDM symbol numbers and the corresponding power adjustment parameters, wherein in the first correspondence, when a first OFDM symbol number is greater than a second OFDM symbol number, a first power adjustment parameter corresponding to the first OFDM symbol number is less than a second power adjustment parameter corresponding to the second OFDM symbol number.

12. The base station according to claim 9, wherein the transmission parameter comprises a numerology of the uplink transmission channel, and the numerology comprises a subcarrier spacing and a CP length;
the first processor is further configured to execute the first computer program to:
obtain a third power adjustment parameter corresponding to the subcarrier spacing of the uplink transmission channel according to a predetermined second correspondence between the subcarrier spacings and the corresponding power adjustment parameters, wherein in the second correspondence, a value of the power adjustment parameter increases as the subcarrier spacing increases;
obtain a fourth power adjustment parameter corresponding to the CP length of the uplink transmission channel according to a predetermined third correspondence between the CP lengths and the corresponding power adjustment parameters, wherein in the third correspondence, a value of the power adjustment parameter decreases as the CP length increases; and
obtain a weighted sum of the third power adjustment parameter and the fourth power adjustment parameter according to a first weight of the subcarrier spacing and a second weight of the CP length, to obtain the power adjustment parameter corresponding to the numerology.

13. The base station according to claim 9, wherein the transmission parameter comprises a transmission waveform used by the uplink transmission channel;
the first processor is further configured to execute the first computer program to:
obtain the power adjustment parameter corresponding to the transmission waveform used by the uplink transmission channel according to a predetermined fourth correspondence between the transmission waveforms and the corresponding power adjustment parameters.

14. The base station according to claim 9, wherein the transmission parameter comprises a transmission waveform used by the uplink transmission channel;
the first processor is further configured to execute the first computer program to:
obtain the power adjustment parameter corresponding to the transmission waveform used by the uplink transmission channel according to a power adjustment parameter of a predetermined transmission waveform and a power offset between the transmission waveform used by the uplink transmission channel and the predetermined transmission waveform.

15. A mobile terminal, comprising a second memory, a second processor, and a second computer program stored in the second memory and capable of being executed by the second processor, wherein the second processor is configured to execute the second computer program to:
obtain a power adjustment parameter, the power adjustment parameter being determined by the mobile terminal according to an OFDM symbol number of an uplink transmission channel; and
adjust a transmission power of the uplink transmission channel according to the power adjustment parameter,
the power adjustment parameter is determined by the terminal according to the OFDM symbol number of the uplink transmission channel through a following formula:

power offset=−10 log 10$(L/L_0)_L$ wherein the power offset represents the power adjustment parameter, the $L_0$ represents a predetermined reference OFDM symbol number, and the L represents the OFDM symbol number of the uplink transmission channel.

16. The mobile terminal according to claim 15, wherein the uplink transmission channel comprises a PUCCH.

* * * * *